Dec. 27, 1927.  1,653,728
F. OBERST
CABLE
Filed July 28, 1925
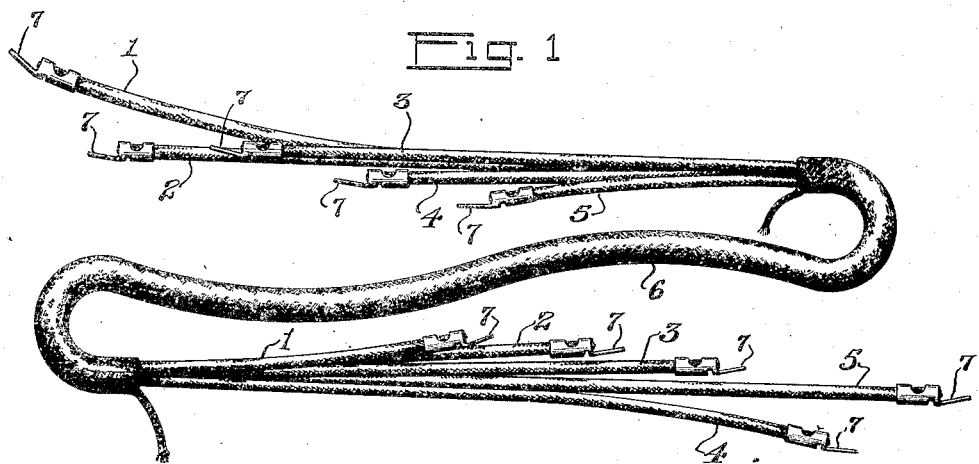
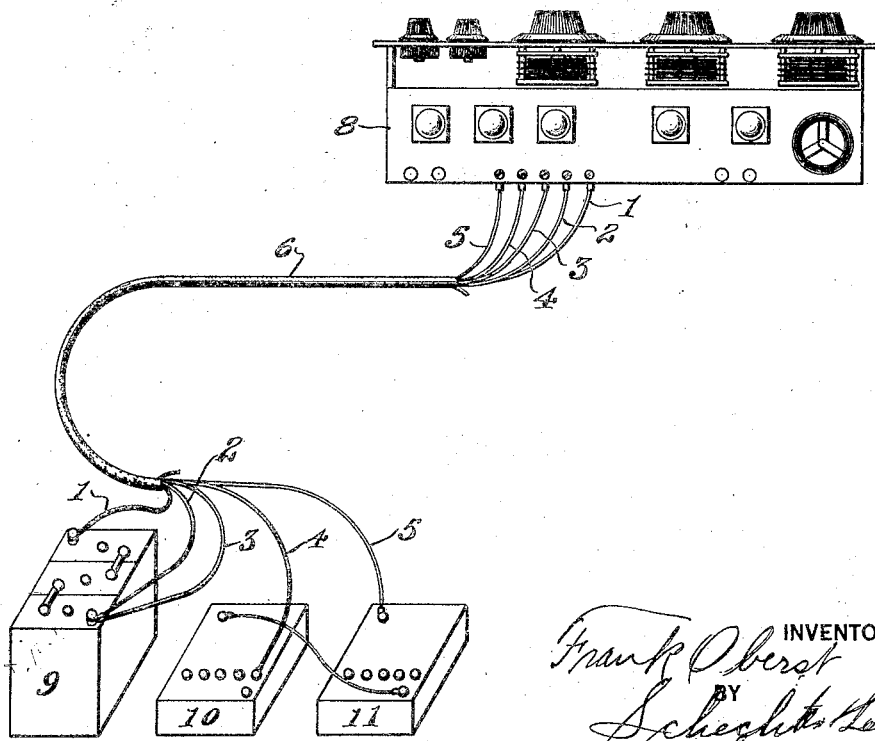

Patented Dec. 27, 1927.

1,653,728

UNITED STATES PATENT OFFICE.

FRANK OBERST, OF NEW YORK, N. Y., ASSIGNOR TO SONORA PHONOGRAPH COMPANY, INC., A CORPORATION OF NEW YORK.

CABLE.

Application filed July 28, 1925. Serial No. 46,539.

The present invention relates generally to improvements in cables and more particularly to cables adapted for use in radio receiving apparatus.

One of the objects of my invention is the prevention of accidental contact between the terminals of a group of component wire leads forming a battery cable.

Another object is to provide a battery cable which will protect and lengthen the lives of the audion tubes and batteries by preventing accidental short-circuiting contacts.

Another object is to provide a cable in which each of the component wire leads are of just the proper length to make the connections for which it is intended, thus eliminating the necessity of cutting and baring the ends of each wire and fastening terminals thereon which is ordinarily necessary when the wires are not of the proper length.

A further object is to provide means, in addition to the mere coloring of the component leads, whereby the proper lead may be conveniently selected to make any particular connection desired. This means consists in making the length of each of the component leads, different from every other lead, in respect to the distance which it extends from the end of the cable covering, thus producing a graduated arrangement of leads.

Also a further object of my invention is to provide a battery cable which will be fool-proof, neat, compact and convenient to handle.

With these and other objects in view, to be more fully set forth hereinafter, the invention consists in the novel construction, and arrangement of parts which will be exemplified in the operation and construction herein described in the following specification and illustrated in the accompanying drawings:

The invention will first be described in connection with the accompanying drawings, wherein similar reference characters are used to designate corresponding parts throughout the several views, and more specifically defined and indicated in the appended claims.

Attention is directed to the drawings in which:—

Fig. 1 is a plan view of my invention, and Fig. 2 is a diagrammatic view illustrating my invention utilized in connection with a radio receiving set.

The wire leads 1, 2, 3, 4 and 5 may be provided with suitable metal connecting tips 7 and may be all of one length and grouped together, within the cable covering 6, so that the ends of these leads extend unequal distances from either end of said cable covering so as to give the graduated arrangement as shown in Fig. 1. In this arrangement the longest lead 1 on one end of the cable covering becomes the shortest on the other end, while the next longest lead 2 becomes the next shortest on the end as will be obvious.

If desirable, leads of different lengths may be grouped together within a cable covering so that the terminals extend different distances from either end of the covering to give the same graduated arrangement. For certain purposes the leads may also be of different lengths with all terminals on one end equally distant from the cable covering, thus giving the graduated arrangement at the other end.

The leads may be readily identified by their lengths on either side of the cable covering, but as an additional means of identification the covering of each lead may be of any suitable color or combination of colors, or the leads may be tagged for identification in any suitable manner. Thus the covering of lead 1 may be blue with a yellow thread extending therethrough, lead 2 may be black with a red thread, lead 3 solid black, lead 4 solid green, and lead 5 solid red.

In Fig. 2 my improved battery cable is shown utilized in making the proper connections between the terminals on the radio set 8, and the "A" battery 9 and "B" batteries 10 and 11. The lead 3 may be used to connect in a "C" battery if desired. It will be noted that the graduated arrangement of leads permits of bringing the battery cable 6 into a parallel position with respect to the radio set without cramping or bending the leads. This is advantageous, as when radio sets are assembled within cabinets. It will also be noted that the graduated arrangement of the leads permits ready and convenient attachment to the proper battery terminal without any cramping, surplusage or unnecessary lengths of leads. Each lead being of just a suitable length to make its respective connection.

In accordance with the provisions of the patent statutes, I have described my invention together with the construction which I now consider to represent the best embodiment thereof, but I desire it understood that my invention is not confined, to the particular form shown and described, the same being merely illustrative, and that the invention can be carried out in other ways without departing from the spirit of my invention, and therefore, I claim broadly the right to employ all equivalent instrumentalities coming within the scope of the appended claims, and by means of which objects of my invention are attained, and new results accomplished, as herein set forth, as it is obvious that the particular embodiments herein shown and described are only some of many that can be employed to attain these objects and accomplish these results.

Having now described my invention, what I claim and desire to secure by Letters Patent, is:—

1. As an article of manufacture, a multiple conductor adapted to connect an electrical translating device having a plurality of input connections with a power source having a corresponding number of output connections, said conductor having a plurality of conducting leads of equal length enclosed throughout their middle portion by a common cover, each of said leads projecting from one end of said cover a greater distance than from the other end, and each lead projecting from each end of said cover a different distance from every other lead, whereby the user, by observation of the complementary length of the parts of the leads projecting from the cover, may readily identify the ends of the same lead at both ends of the cover.

2. As an article of manufacture, a multiple conductor adapted to connect an electrical translating device having a plurality of input connections with a power source having a corresponding number of output connections, said conductor having a plurality of insulated conducting leads of equal length enclosed throughout their middle portion by a common cover, each of said leads having an end projecting from an end of said cover a different distance from every other lead projecting from the same end of said cover, and each so projecting lead having a conducting, connecting tip, each tip being of a length less than the difference in length between the projecting end of the lead to which it is attached and the projecting end of the lead most nearly corresponding in length to said first mentioned projecting end of a lead whereby, when said projecting ends of the leads are in contact, said tip will be adjacent insulated portions of all other leads.

This specification signed this 21st day of July, 1925.

FRANK OBERST.